L. W. CARROLL.
AUTOMATIC CUT-OUT FOR AERIAL TELEPHONE LINES AND THE LIKE.
APPLICATION FILED MAY 24, 1907.
996,701.
Patented July 4, 1911.
2 SHEETS—SHEET 1.
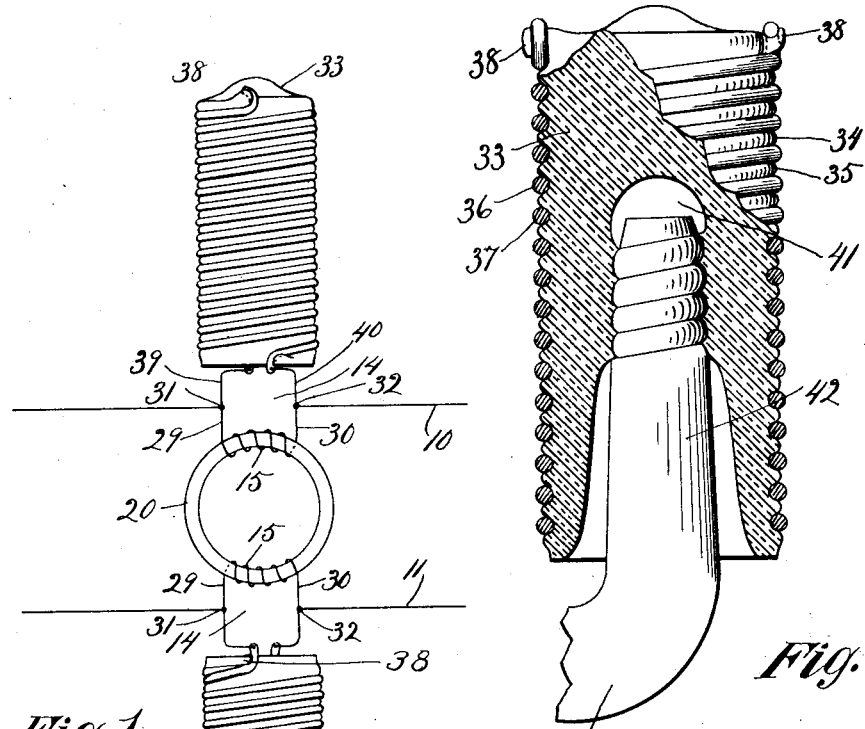
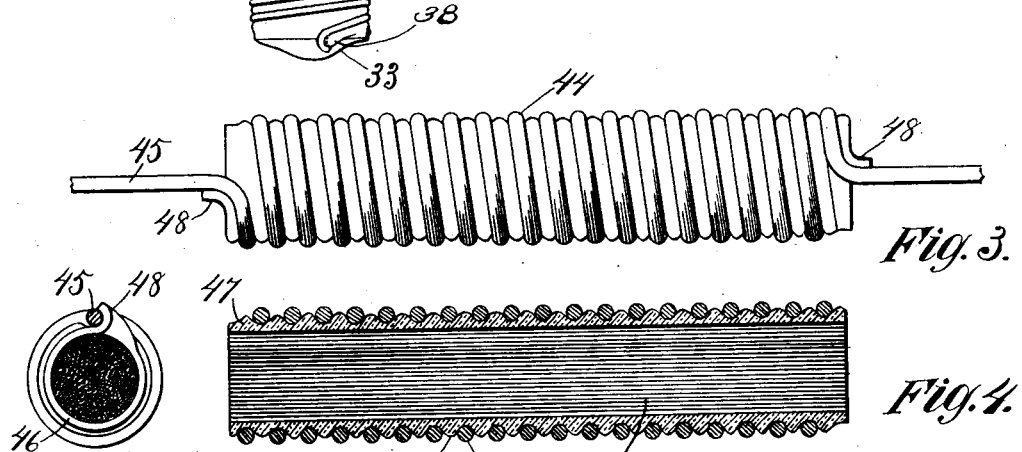
Witnesses:
W. H. Cotton
Charles B. Gillson
Inventor:
Louis W. Carroll
By Louis K. Gillson Atty.

L. W. CARROLL.
AUTOMATIC CUT-OUT FOR AERIAL TELEPHONE LINES AND THE LIKE.
APPLICATION FILED MAY 24, 1907.
996,701.
Patented July 4, 1911.
2 SHEETS—SHEET 2.
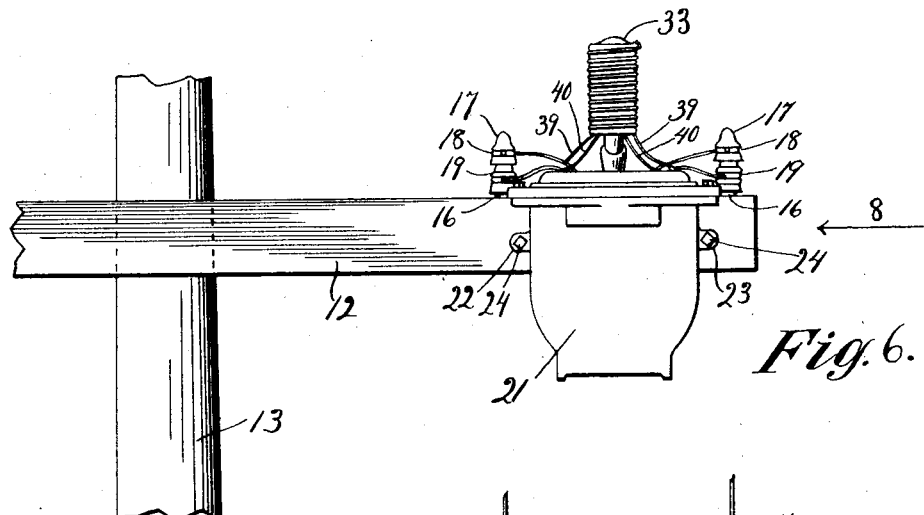
Fig. 6.
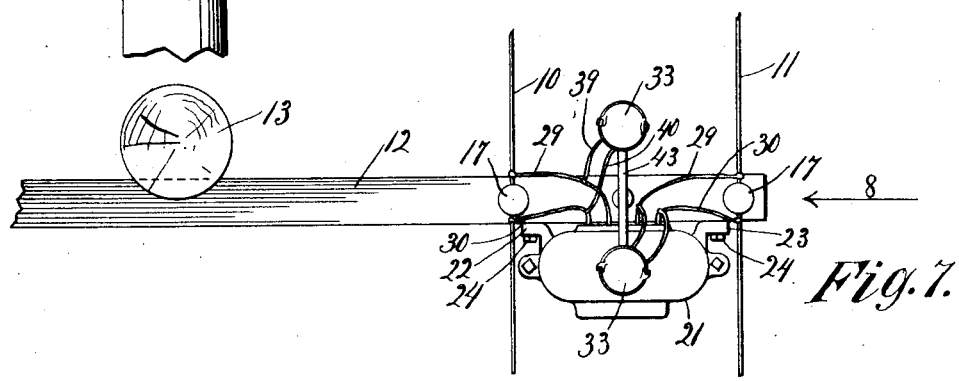
Fig. 7.
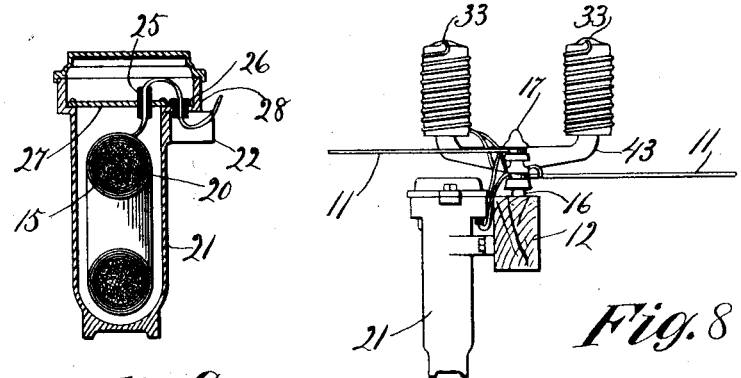
Fig. 9.
Fig. 8.
Witnesses:
W. H. Cotton
Charles B. Gillson
Inventor
Louis W. Carroll
By Louis K. Gillson, atty.
COLUMBIA PLANOGRAPH CO., WASHINGTON, D. C.

UNITED STATES PATENT OFFICE.

LOUIS W. CARROLL, OF ANAMOSA, IOWA.

AUTOMATIC CUT-OUT FOR AERIAL TELEPHONE-LINES AND THE LIKE.

996,701.  Specification of Letters Patent.  Patented July 4, 1911.

Application filed May 24, 1907. Serial No. 375,481.

*To all whom it may concern:*

Be it known that I, LOUIS W. CARROLL, a citizen of the United States, and resident of Anamosa, county of Jones, and State of Iowa, have invented certain new and useful Improvements in Automatic Cut-Outs for Aerial Telephone-Lines and the Like, of which the following is a specification, and which are illustrated in the accompanying drawings, forming a part thereof.

The invention relates to electrical conductors, and particularly to those intended for use in situations in which they are subjected to changes in the conditions under which they operate, as are the conductors of aerial telephone lines when formed of bare metallic wire exposed to the weather by being strung upon poles.

It has long been recognized that the conductors employed for the transmission of electric energy have a certain capacity for static charges of electricity, and that, therefore, before an electric current can be made to traverse a conductor, the conductor must first be charged with electricity from some source of electric energy, as, for example, that which supplies the traversing current. When a direct current is used, the conductor which it traverses becomes charged immediately upon its being put into electrical connection with the source of current, and no further absorption of current is then effected. When, however, an alternating current is employed, each impulse of current has not only to charge the conductor which it is to traverse, but must first neutralize a charge of the opposite sign imparted to the conductor by the last preceding current impulse. For that reason alternating currents of high frequency are made to traverse an electric circuit with difficulty when the conductors of which the circuit is formed have a high capacity for static charges of electricity, either by reason of their great length or because of their form or the manner in which they are hung with relation to other conductors of the same circuit and various surrounding objects. It has in fact been found that the capacity of conductors of long-distance telephone lines for static charges of electricity is in some instances too great to permit of their being completely charged by electric impulses of such short duration as those from which an alternating current produced by the transmitting appliances of telephone apparatus are composed. Particular difficulty is experienced in obtaining the transmission over long-distance telephone lines of those alternating electric currents having a frequency of vibration corresponding to that of musical tones of high pitch, as, for example, the overtones or harmonics present in the sounds produced by the human voice. For this reason the quality and volume of the sounds of the voice, as reproduced by long-distance telephone apparatus, are much impaired, and it is difficult for words to be distinguished and the voices of acquaintances to be recognized at the receiving instrument of such apparatus.

It has been supposed that the deleterious effect of the capacity of a telephone line for static charges of electricity is the result of the presence of supplemental or subsidiary currents which are out of phase with the principal or voice currents impressed upon the line, and it has been proposed to remedy this difficulty by placing in circuit with the conductors of the line apparatus designed to produce further supplemental or subsidiary currents by self-induction of such phase that they will neutralize the subsidiary currents which are present because of the capacity of the line. Such apparatus takes the form of a coil or helix of conducting wire having a soft iron core, and these coils are commonly termed impedance or load coils.

Load coils are used in long-distance telephone lines at intervals ranging from a fraction of a mile to several miles in length, the proper length of the intervals and the required dimensions of the coils being determined by a mathematical computation. The use of these coils is termed loading the line, and in telephone lines having a capacity for static charges of electricity which may be accurately determined and which remains substantially constant, excellent results have been thus obtained. Inasmuch, however, as the capacity of an electric conductor for static charges of electricity depends upon the character of the medium which separates the conductor from surrounding objects, and particularly from the companion conductor of the same telephone circuit, the use of load coils has heretofore been uniformly successful only upon telephone lines in which the companion conductors of a circuit are inclosed together within the protective covering of an insulated cable.

In telephone lines having conductors of bare wire strung upon poles, the capacity of the conductors is very materially changed by a variation in atmospheric conditions, and if such a line be loaded with coils designed to neutralize the deleterious effect of the capacity of the line for static charges of electricity in clear and dry weather, the coils will not only fail to operate in the desired manner when the conductors are surrounded by a wet or smoky atmosphere, but inasmuch as each coil contains a considerable length of conducting wire which the current must traverse, and is necessarily of that form which opposes the passage of alternating and other variable currents, a large amount of resistance is added to the line which then serves no useful purpose. A further difficulty attending the use of load coils upon aerial telephone lines arises from the fact that when the insulation of the line is partially destroyed by reason of the insulators to which the conductors of the line are secured becoming coated with a film of moisture or soot, there is a dissipation or leakage of the currents traversing the line particularly of those subsidiary currents which are the result of the capacity of the line. Both of these effects produced by a change in atmospheric conditions, contribute to destroy the balance or neutralization effected by the use of load coils, the dimensions of which have been determined by a mathematical computation based upon the properties of the line when dry.

The invention contemplates a conductor for telephone lines having load coils or other apparatus designed to assist in the transmission of electric currents over the line under usual or normal conditions of operation, and means for automatically establishing a by-path for current between the terminals of such apparatus when the conditions of operation have been so changed, as by reason of the presence of moisture or smoke in the atmosphere surrounding the conductor, that the apparatus no longer serves the purpose for which it was intended.

The object of the invention is to simplify and improve the construction of the electrical conductors of aerial telephone lines.

In the accompanying drawings,—Figure 1 shows in diagram the method of applying the cut-out apparatus provided by the invention to the conductors of a telephone line provided with load coils of the usual form; Fig. 2 shows in side elevation and partly in central vertical section the cut-out apparatus indicated in Fig. 1; Fig. 3 is a side elevation of a load coil for telephone lines so constructed as to include within itself the cut-out apparatus provided by the invention; Figs. 4 and 5 are a central longitudinal section and an end view, respectively, of the parts shown in Fig. 3; Fig. 6 illustrates apparatus of the form shown in Fig. 1 applied to the cross-arm of a telephone pole; Fig. 7 is a plan view of the parts shown in Fig. 6; Fig. 8 is an end elevation of the same, viewed in the direction of the arrow in Figs. 6 and 7; and Fig. 9 is a central vertical section of a detail of the apparatus illustrated in Figs. 6, 7 and 8.

The companion conductors of a telephone line are designated by the numerals 10 and 11. Each is adapted to be secured in the usual manner, except as hereinafter described, to the cross-arms, as 12, of a plurality of telephone poles, as 13. At suitable intervals, either one or both of the conductors, when two are used as shown, will be divided, as indicated at 14, Fig. 1, for the introduction of a load coil 15. This dividing of the conductor is most conveniently effected by providing the securing pin 16 of the cross-arm 12 of the telephone pole 13 which is located at that point where the division is to be made, with an insulating cap of the form commonly termed a double-shackle insulator and having two circumferential grooves, as 18, 19, one for receiving each of the severed ends of the conductor.

When load coils 15 are applied to the companion conductors 10 and 11 of a telephone line at the same supporting pole, the coils 15 for the two conductors will preferably have a common core, in the form of a ring 20, and this ring, together with the coils which it carries, will be mounted within a covered box 21, which is adapted to be secured to the cross-arm 12 of the telephone pole 13 by means of lag screws 24, driven into the cross-arm 12 through apertured lugs 22, 23, formed on the wall of the box. The box 21 is provided with an inner cover 27, designed to protect the coils within the box from moisture, and apertures, as 25 and 26, each provided with an insulating bushing, are formed in the cover 27 and in the floor 28 of an overhung portion of the wall of the box for receiving the terminals 29, 30 of the coils 15, the terminals of each of the coils being led out of the box 21 and connected to the conductor 10, 11, at each side of the division 14, as at 31, 32, Fig. 1.

As so far described, the apparatus is of well known construction and conforms to that now in common use for long-distance aerial telephone lines.

By means of the invention an alternate path for electric current not including the load coil 15, is provided between the parts of the conductor at each side of the coil, when by reason of the presence of moisture or smoke in the atmosphere surrounding the conductor the load coil 15 becomes inefficient. Preferably a cylindrical block 33, two of which are shown, one for each of the conductors 10, 11, has a pair of juxtaposed helical grooves 34, 35 formed upon its surface, and a conductor, as 36, 37, is laid into each of the grooves. The block 33 is of insulating material and the conductors 36, 37 preferably of bare metallic wire, and are so disposed upon the surface of the block that they lie in juxtaposition for a considerable length, but are nowhere in contact. Knobs 38 are formed upon the wall of the insulating cylinder 33 adjacent each of its ends, and the ends of each of the conductors 36, 37, are hooked about these knobs to prevent displacement of the conductors in the grooves 34, 35. The conductors 36, 37 have electrical connection through wires 39, 40 with the conductor, as 10, to which the device is applied, at opposite sides of the division 14 provided for the introduction of the load coil 15.

The insulating cylinder 33, with its juxtaposed and unprotected conductors 36, 37, is supported in an exposed position upon the pole 13, and during a rain storm or when the surrounding atmosphere is heavily laden with moisture or smoke, the space between the conductors 36, 37 will be bridged over by a deposit of moisture or smoke upon the surface of the insulator 33, thus establishing a path for current not including the load coil 15 between the terminals 31, 32 of the parts of the conductor at opposite sides of the coil. The high resistance of the load coil 15, which, as already pointed out, serves no useful purpose during wet or smoky weather, is thus avoided. As soon, however, as the atmosphere again becomes dry, the deposit of moisture on the surface of the insulating cylinder 33 will evaporate, thus requiring electric currents passing over the line to again traverse the load coil 15. Preferably the insulating cylinder 33 is provided with a threaded socket 41, and when one is used for each of two companion conductors of a telephone line as shown, they will be most conveniently mounted upon the prongs 42 of a two-prong bracket 43 mounted on the cross arm 12 between the pegs 16, 16 to which the conductors are secured, as is most clearly shown in Figs. 6, 7 and 8 of the drawings.

If desired, load coils of the form shown in Figs. 3, 4 and 5 may be employed, the turns 44 of the coil being preferably of the bare wire, from which the conductors, as 45, are formed, and being laid into a helical groove 46 formed about the periphery of a tubular insulator 47. At each end of the insulator a hook, as 48, is provided, to which the wire from which the coil is formed may be attached, and within the insulator a core 49, of soft iron, will be provided. Load coils of this type may be formed in telephone conductors 45 before the conductors are hung for use, and they may be distributed at short intervals over the line, the weight of the core 49 being varied to render the self-induction of the coil of the proper strength to neutralize the capacity of the conductor for static charges of electricity. When the conductor 45 is exposed to a moist or smoky atmosphere, such as will reduce its capacity for static charges of electricity, a film of moisture or smoke will be deposited upon the surface of the insulator 47 and provide a path for current between the several turns 44 of the coil.

When either form of apparatus described is used upon aerial telephone lines, a path for current will be established between the turns of wire upon the insulator 33 or 47 whenever there is a leakage of currents from the line by reason of a deposit of moisture or soot upon the insulators supporting the line conductors.

The form of apparatus illustrated in Figs. 1 and 2 and in Figs. 6 to 8, inclusive, provides in effect a variable resistance shunt between the terminals of the load coil, the resistance of the shunt being determined by the hygrometric condition of the atmosphere surrounding the conductors of the telephone line.

I claim as my invention:

1. In combination, a divided electrical conductor of bare metallic wire, an insulated support for the conductor exposed to the weather, an automatic cut-out supported in a similarly exposed position and comprising a block of insulated material, and a pair of adjacent but non-contacting conductors applied to the surface of the block, electrical connection between each of the conductors of the cut-out and one of the parts of the first-named conductor, and apparatus connected in parallel with the cut-out between the parts of the first-named conductor.

2. In combination, a divided aerial electrical conductor, an impedance coil in circuit with the parts of the conductor, and a variable resistance shunt between the terminals of the coil, the resistance of the shunt being controlled by the hygrometric condition of the atmosphere surrounding the conductor.

3. In combination, a divided electric telephone line conductor, a load coil in circuit with the parts of the conductor, and a shunt between the terminals of the coil of such character that its resistance is automatically reduced when the capacity of the telephone line conductor for static charges of electricity is reduced by a change in conditions about the conductor.

4. In combination, a pair of substantially parallel line conductors of a telephone circuit, each of the said conductors being divided, a load coil in circuit with the parts of each conductor, the two load coils having a common core, and a variable resistance shunt between the terminals of each of the coils.

LOUIS W. CARROLL.

Witnesses:
CHARLES B. GILLSON,
LOUIS K. GILLSON.

Copies of this patent may be obtained for five cents each, by addressing the "Commissioner of Patents, Washington, D. C."